July 27, 1943.  W. A. WEIGHTMAN  2,325,291
WELDING APPARATUS
Filed Dec. 7, 1940  5 Sheets-Sheet 4

INVENTOR
William A. Weightman

John V. Tubox
ATTORNEY

Patented July 27, 1943

2,325,291

UNITED STATES PATENT OFFICE 2,325,291

WELDING APPARATUS

William A. Weightman, Philadelphia, Pa., assignor to Edward G. Budd Manufacturing Company, Philadelphia, Pa., a corporation of Pennsylvania Application December 7, 1940, Serial No. 369,006

10 Claims. (Cl. 219—4)

This invention relates to multiple spot welding apparatus and more particularly to apparatus adapted to the effecting of a multiplicity of spot welds in a workpiece of irregular shape.

In welding angle reinforcing members to flanged plates wherein it is essential to provide a plurality of closely spaced welds, some of which have axes at right angles to the others and because of their proximity to one another may not readily be welded by guns free from interference with one another, the present apparatus is adapted to provide mechanism for bringing a plurality of welding guns into rapid multiple welding position and after completion of the welds, retract the guns and bring another set into position, thus permitting the effecting of a large number of welds automatically in a relatively short space of time.

Because of the fact that the welding is generally performed upon stampings which, for many reasons, may not always conform to the desired or final shape due to bending and handling in the stacking of the material prior to feeding the same into the machine, considerable difficulty is often had in loading the stampings into the jig which is adapted to hold the stampings in proper position in the machine during welding. The present machine contemplates a novel loading arrangement whereby two similar jigs are employed, either one of which may be fed into the machine so that, as soon as one jig or the other is loaded, welding may be immediately commenced and delay in actual welding operation of the machine due to difficulty in loading one or the other of the jigs is avoided. In addition, free equalization of pressure between welding electrodes is provided for so that irregularities are readily compensated for.

It is, accordingly, an object of the invention to provide in a multiple spot welding machine an arrangement in which a plurality of welds may be effected in a short space of time in closely spaced quarters such that some of the welding electrodes would interfere with others, and in the provision of means for retracting a portion of the welding electrodes from welding position while bringing other electrodes into position.

Another object of the invention is the provision of duplicate loading mechanism for an apparatus of the type described in which either loading mechanism may be inserted into the welding apparatus so that a plurality of welds may be effected without delay in the event of difficulty in loading one or the other of the loading mechanisms.

A further object of the invention is to provide in conjunction with a multiple spot welding machine, a plurality of work loading, feeding and jigging mechanisms whereby the jigging and loading operation may exceed the welding time, and yet the welding machine be operated with relative efficiency and no interruption.

Still another object of the invention is to provide welding guns fully capable of engaging the work under equalized pressure to compensate for work irregularities.

The above and other novel features of the invention will appear more fully hereinafter from the following detailed description when taken in conjunction with the accompanying drawings. It is expressly understood, however, that the drawings are employed for purposes of illustration only and are not designed as a definition of the limits of the invention, reference being had for this purpose to the appended claims.

Referring to the drawings in which like reference characters indicate like parts.

Figures 1, 7:
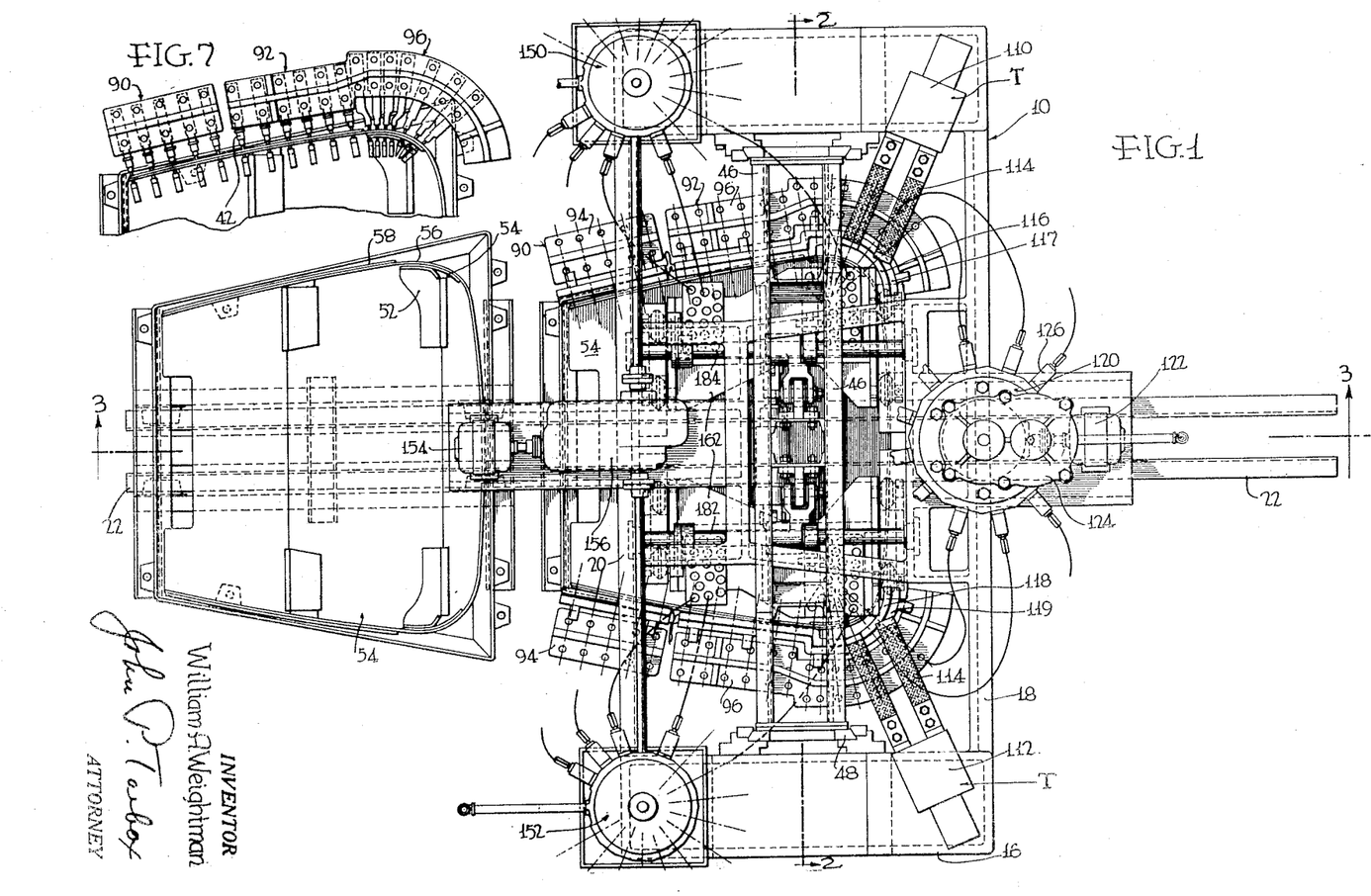
Figure 1 is a top plan view of the machine illustrating the same in position for the welding operation.
Figure 7 is a fragmentary plan view in detail of a plurality of the welding guns diagrammatically shown in Figure 1 for the purpose of more clearly illustrating the arrangement thereof.
Figure 2:
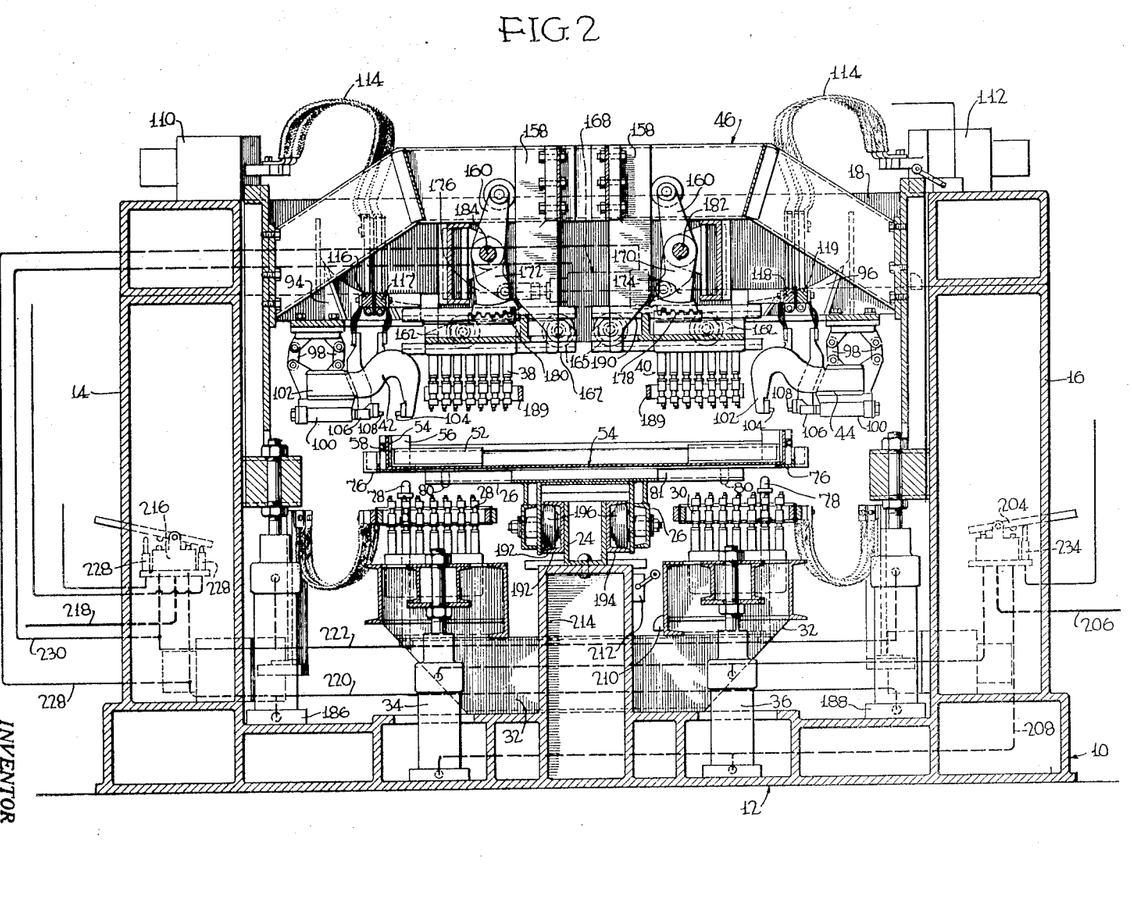
Figure 2 is a transverse vertical section taken through the machine of Figure 1, taken substantially on the line 2—2 thereof.
Figure 3:
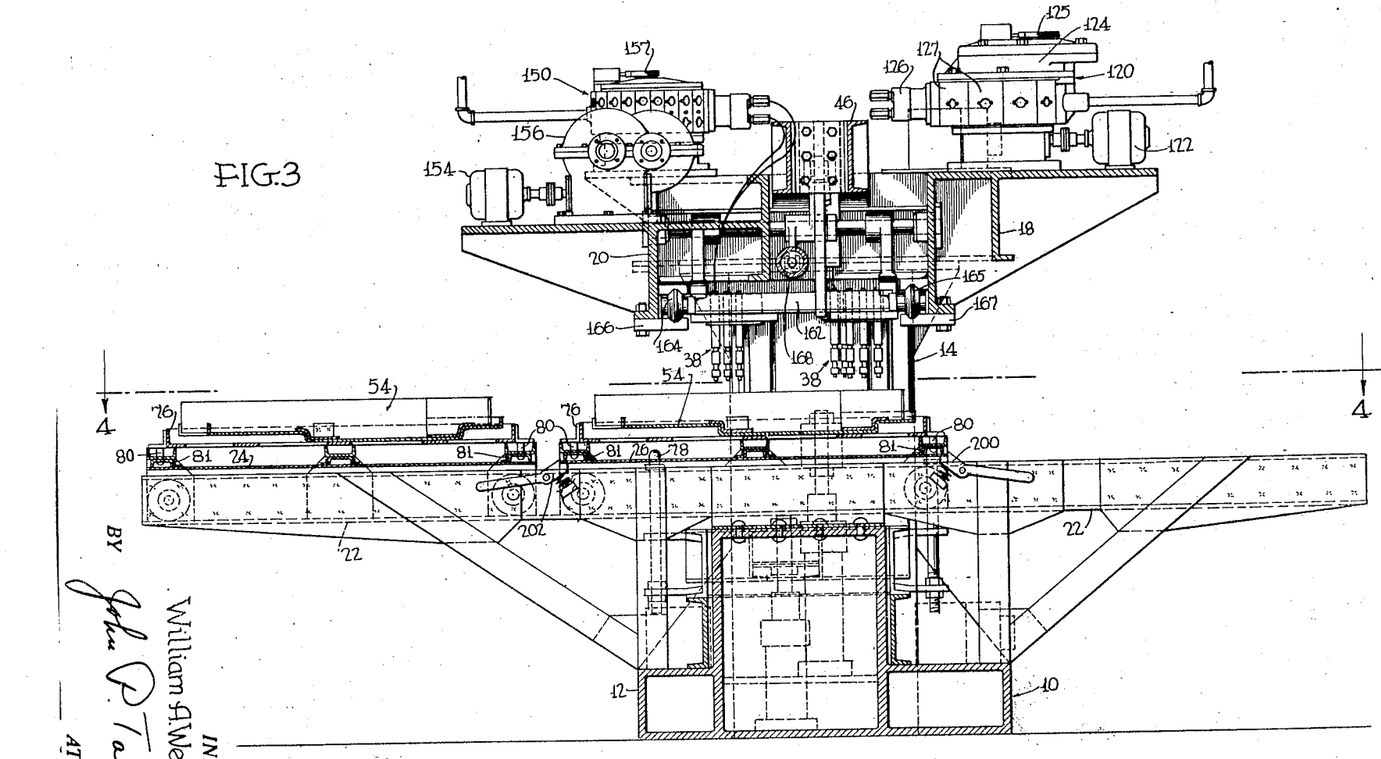
Figure 3 is a vertical longitudinal section taken through the machine substantially on the line 3—3 of Figure 1.

Referring to the drawings and particularly to Figures 1 through 3, there is illustrated a main frame 10 having a transverse base portion 12, spaced upright columns 14 and 16 at either end of the base portion 12, and transversely extending spaced top bridge members 18 and 20. Extending through the machine transversely to said base portions between the columns 14 and 16 and underneath the bridge members 18 and 20 and supported from the base member 12 is a track 22 upon which are provided work supporting carriages 24 and 26. Within the machine proper and between the columns 14 and 16 are supported a plurality of welding electrodes some of which have substantially horizontal axes and others of which have substantially vertical axes. As illustrated, sets of electrodes 28 and 30 on either side of the track 22 are vertically reciprocably mounted upon a lift 32 arranged to be elevated by fluid pressure motors 34 and 36 acting between the base member 12 and the lift. Supported from the bridge members 18 and 20 but laterally movable into alignment with the electrodes 28 and 30 are complementary sets of electrodes 38 and 40. The guns with electrodes having substantially horizontal axes are illustrated at 42 and 44, there being a set of such guns on each side of the machine, see particularly Figure 2. Some of the guns of each set, in order to avoid interference with other guns, are vertically movable by reason of their mounting upon a frame structure 46 reciprocating in ways 48 and 50 arranged upon the columns 16 and 14.

Figure 4:
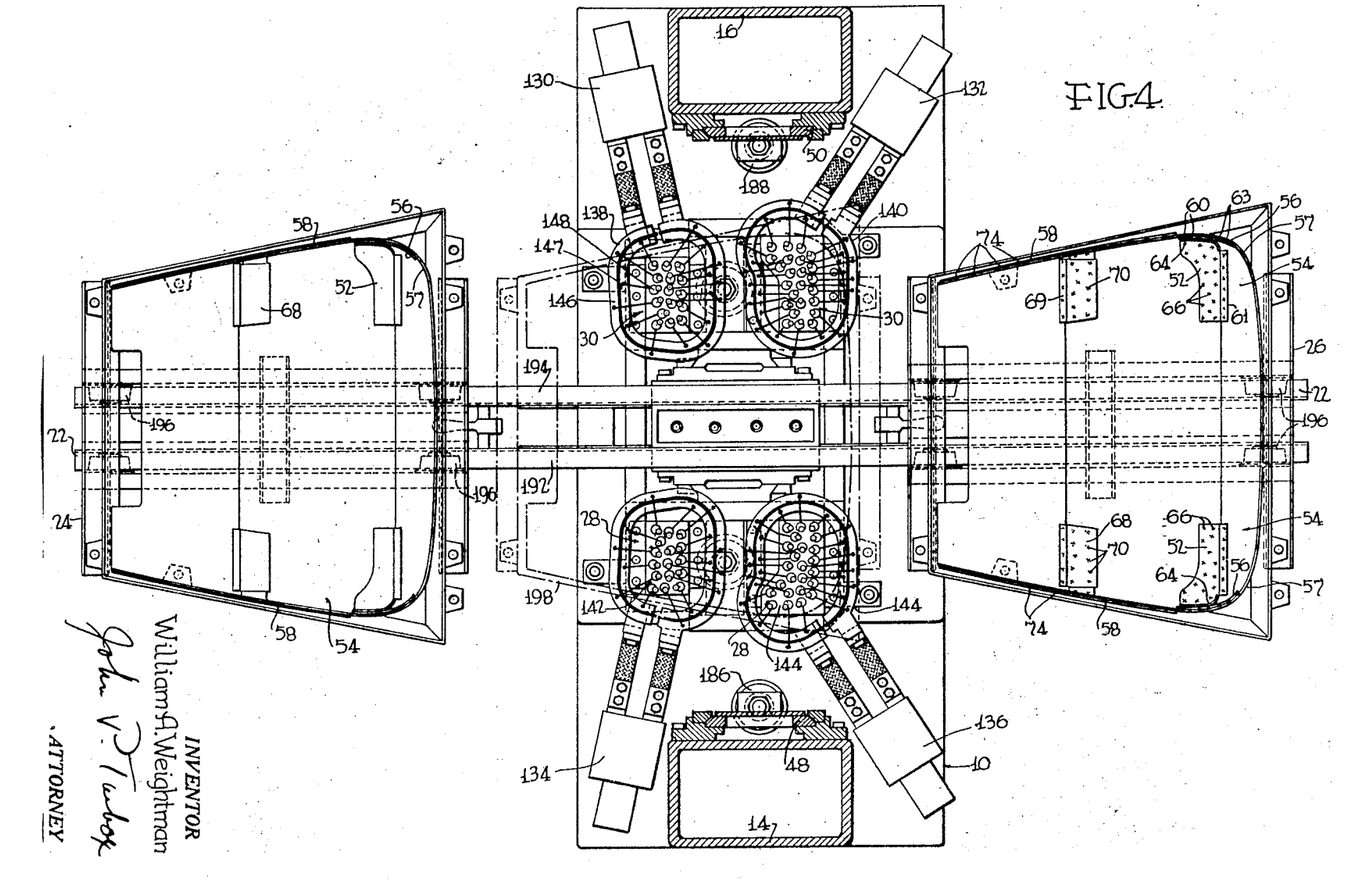
Figure 4 is a horizontal section taken through the machine substantially on the line 4—4 of Figure 3 illustrating the arrangement of a plurality of welding electrodes and the loading jigs and carriages.

It will be observed in referring to Figure 2, for example, that in the securing of a reinforcing angle member 52 within a large flanged stamping 54 as well as other reinforcing members 56 and 58 all of which require welding to the flanged stamping 54, a plurality of welds are required in extremely close quarters. Through the relative movements of the vertical electrodes and the horizontal electrodes such that certain of the electrodes are in operative position at a time when the others are moved out of the way to an inoperative position and vice versa, the necessary welds in the extremely close quarters of the work illustrated may be effected. This may be pointed out in conjunction with Figure 4 particularly where there is shown a finished flanged stamping 54 in plan with the reinforcing members secured thereto together with the approximate location of welds. In this figure it will be seen that, as a result of the welding operations performed by the apparatus herein disclosed and to be more particularly described, the angle plates 52 are welded to the stamping 54 through a reinforcing plate 56 by substantially horizontal axis welds 60 passing through the upstanding flange 64 of the angle plates 52, the reinforcing plate 56 and the flange 57 of the stamping 54. Additional welds 63 are effected between the reinforcing plate 56 and the flange 57 alone. In addition, a plurality of vertical axis welds 66 are effected between the plate 52 and the main flat portion of the flanged stamping 54. In addition, plates 68 are spot welded to the flat portion of the stamping 54 as by vertically disposed welds 70. A channel member 58 may also be secured along the flange 57 of the stamping 54 by a plurality of welds 74 whose axes are horizontally disposed. The proximity of the large number of welds indicated in Figure 4 is thus clearly presented together with the difficulty of rapidly bringing apparatus into operative position to produce such welds.

Figure 5:
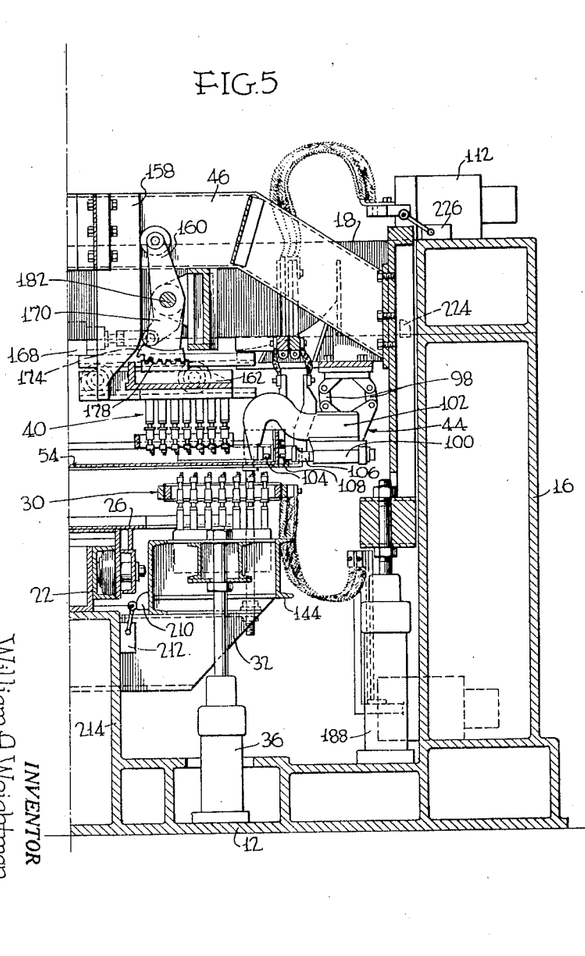
Figure 5 is a partial transverse section taken through the machine substantially on the same plane as that of Figure 2 but illustrating a subsequent stage in the operation thereof.

Referring again to Figure 2, reference is again made to the central part of the machine wherein the stamping 54 together with the various reinforcing members which are to be attached thereto by welding are all assembled in a jig 76, the jig being provided with clamping means, not shown, for securing the members in proper position. The jig illustrated in Figure 2 is fitted with pins 80 loosely extending through apertures in the frame 81 of the carriage 26. Through the engagement of shouldered pins 78 carried upon the lift 32, the jig may be elevated from the carriage and lifted together with the workpieces thereon into welding position (see Figure 5). In welding position the horizontally disposed welding guns 44 are adapted to place a plurality of welds 60 and 63 through the flange 57 of the stamping 54 and the reinforcing members 56 and 52. Also suitable welds 74 are effected between the channel member 58 and the flange 57 through other similar guns suitably adjusted to engage the parts at such points as are desired. While retaining this same welding position of the work, the vertical guns 28 and 30 and 38 and 40 are adapted to be aligned to effect welds 66 and 70.

Referring more in detail to the horizontal welding guns, reference will be had to Figure 7 wherein the general plan lay-out of the guns 42 on one side of the machine is illustrated. The welding guns 42 are arranged in two sets 90 and 92, the set 90 being composed of five guns suspended from a frame member 94 rigidly secured to the transverse bridge member 20. The group of guns 92 are suspended from a frame 96 carried by the reciprocating frame structure 46. The group 90 of the guns, therefore, remain stationary and do not change their position, whereas the guns of group 92 are adapted to be raised and lowered out of and into position. Each gun of either group 90 or 92 is suspended from a frame member 94 or 96 through links 98 so that the gun may be free to float horizontally during operation to equalize electrode pressures. The gun is composed of a fluid pressure cylinder 100 having a C-frame 102 and to which the links 98 are attached, the C-frame secured thereto carrying one welding electrode 104. A piston rod 106 operating out of the cylinder 100 carries the other welding electrode 108, the electrodes 108 and 104 being adapted to cooperate with one another to affect a weld.

To supply the guns 42 with power, transformers 110 and 112 are provided which through flexible jumpers 114 are connected to bus bars 116, 117 and 118, 119. The various welding guns 42 are connected across the bus bars 116 and 117, or 118 and 119 either directly or in pairs in series depending upon the thickness of the metal being welded. For example, the welding guns in the group 90 and those effecting welds in the light channel strip 58 of group 92 may operate in pairs in series, whereas the guns which effect welds 60 and 63 in the heavier reinforcing members 52 and 56 may operate directly across the bus bars. Where the thicknesses of metal are increased to three thicknesses instead of two as for the welds 60 as distinguished from the welds 63, the pressure of the welding guns upon the work may be increased by a larger cylinder bore, so that all guns may effect satisfactory welds from a single transformer and supply bus bars.

Distribution of the current from the transformer to the various guns 42 and 44 is accomplished through the use of a fluid pressure distributor valve 120 which is adapted to step-by-step in sequence deliver fluid pressure to a gun or pairs of guns of both sets 42 and 44 depending upon whether the guns are directly in parallel across the bus bars or in series across the bus bars. During the delivery of fluid pressure to each gun or pair of guns of both sets 42 and 44 as the case may be, the transformer is momentarily supplied with welding current to effect a weld or welds, there being a timer 125 for controlling the welding current in synchronized relation with the distribution of fluid pressure to the various welding guns in sequence. The distributor valve 120 is driven by a motor 122 and through a suitable intermittent drive such as a Geneva gear, not shown, but located within the housing 124, the valves 126 are actuated in sequence. In Figure 3 the housing is shown with most of the valves 126 removed from the ported housing faces 127 in order to make the disclosure as clear as possible and free from confusing duplication. One form of distributor and timer involving a Geneva movement for multiple spot welding is disclosed in a copending application Serial No. 143,600, filed May 19, 1937.

The vertical welding guns 28 and 30 and 38 and 40, as will appear in Figure 1, are each divided into electrode panels, those adapted to effect the welds 70 in securing the reinforcing plates 68 to the stamping 54 and those adapted to effect the welds 66 in securing the reinforcing member 52 to the stamping 54. The lower electrode groups, as indicated at 28 and 30 in Figure 2, are supplied with power from four welding transformers 130, 132, 134 and 136, the welding transformers 130 and 132 supplying the electrode panels 138 and 140 of the electrodes generally indicated by the reference character 30 in Figure 2 and the welding transformers 134 and 136 feeding the panels of welding electrodes 142 and 144 generally indicated by the reference numeral 28 in Figure 2. Each of the panels 138, 140, 142 and 144 are provided with parallel extending ring bus bars 146 and 147 to which the welding electrodes 148 are connected, half of the electrodes being connected to one bus bar 146 and the other half to the other bus bar 147, preferably in such a manner as to substantially equalize the length of conductor leads.

Figure 6:
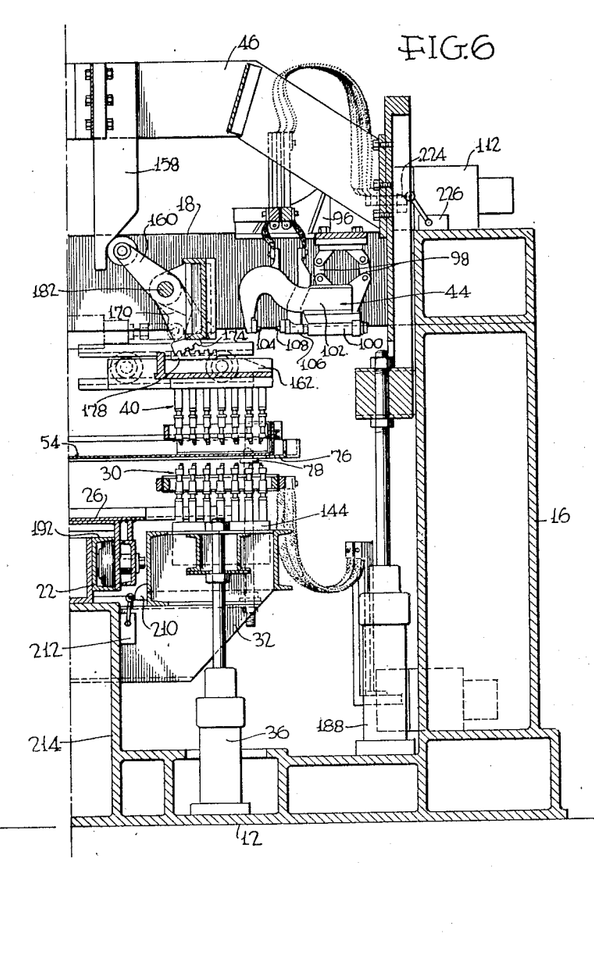
Figure 6 is another partial section of the machine taken substantially on the same plane as Figure 2 and illustrating a further subsequent stage in the operation thereof.

To effect welds, a pair of electrodes, one of which is connected to one bus bar and the other of which is connected to the other, are through fluid pressure actuation caused to be projected upward against the bottom side of the stamping 54 while corresponding electrodes are projected from the top down, which corresponding electrodes are connected together so that two welds are effected in series. As will be observed in Figure 5, the upper electrodes 40 are displaced to the left and out of alignment with the lower electrodes 30, while in Figure 6 the same are illustrated in alignment, with the welding guns 44 elevated out of the way to avoid interference. When the vertical electrodes are in alignment as indicated in Figure 6, fluid pressure is sequentially delivered to pairs of electrodes in the group 30 and the mating group 40 so as to force mating pairs of electrodes into welding engagement with the work. The fluid pressure for effecting the sequence operation of these pairs of electrodes is derived from the distributing valves 150 and 152, the distributing valve 150 being adapted to supply the electrodes of the groups 28 and 38 of Figure 2, whereas the distributing valve 152 supplies the electrodes of the groups 30 and 40 of the same figure. The distributing valves are driven by a common drive motor 154 through a common Geneva gear 156 and, through a synchronized timer 157, the welding transformers 130, 132, 134 and 136 are energized each time pairs of mating electrodes are engaged with the work through fluid pressure delivered thereto. The details of this distribution system, as illustrated in the aforementioned Weightman application, do not form a part of the present invention and are, therefore, only diagrammatically shown, but reference to the aforementioned Weightman application may be had for such further details of the general system. As in the case of the distributor 120, the distributors 150 and 152 are illustrated with a considerable portion of the valves removed from the housing to simplify the disclosure.

In order that the electrode groups 38 and 40 may move outwardly as soon as sufficient upward movement of the welding guns carried upon the frame members 96 is effected, which in turn are carried upon the reciprocating frame structure 46, the same are interlocked by a cam and roller follower mechanism 158 and 160 presently to be described. As will appear in Figures 3 and 5, the groups of welding guns 38 and 40 depend from laterally movable frames 162 provided with rollers 164 and 165 running in stationary tracks 166 and 167 supported from the bridge members 20 and 18. The lateral movement of the groups 38 and 40 is effected through an expansible chamber motor 168 operating upon spaced levers 170 and 172 and thence through sector gears 174 and 176 and racks 178 and 180 affixed to the frames 162. The spaced levers 170 and 172 together with the sector gears 174 and 176 are carried upon transverse shafts 182 and 184, which in turn carry the roller followers 160 whose movement in one direction is constrained by the cams 158.

Movement of the horizontal guns 42 upward and clear of the operative position taken by the groups of guns 38 and 40 is effected through the operation of the expansible chamber motors 186 and 188, the latter together elevating the frame structure 46 and causing the same to reciprocate in the ways 48 and 50. The cams 158 are carried from the frame structure 46 and thereby prevent the roller followers 160 from approaching one another, as is necessary to effect spreading of the groups of electrodes 38 and 40 into operative position, until after the horizontal welding guns have been raised substantially to the clear position and the inclined portions 190 of the cams 158 engage the roller followers 160.

Since each of the vertical welding electrodes are individually fluid pressure operated, equalized pressure is exerted upon the workpieces during welding and irregularities in the surface of the parts undergoing welding are compensated for thereby. For example, as illustrated in Figure 4, the members 52 and 68 are shown as having offset portions 61 and 69 in which the welds are at a higher level than those in the main body portion. The fluid pressure operation of the vertical welding electrodes automatically compensates for this offset. It will be observed that all the electrodes in the groups 38 and 40 located above the work are supported from common frames 162 and that all electrodes in any one group are electrically connected by suitable common bus bars such as 189.

Referring more in detail to the loading mechanism, it will be observed that the track 22 is composed of channel members 192 and 194 in which rollers 196 of the individual carriages travel. In practice, either one of the jigs is loaded in the positions shown in Figure 4 and as soon as one is loaded, the same and its carriage is moved down the track to the central position indicated as at 198 in Figure 4. The movement of the carriage assuming it to be the carriage 24 is limited by a pivoted lever latch and stop 200 against which the carriage abuts when in position. At the same time, the carriage 24 rides over the pivoted lever latch and stop 202 until in position at which time the latch springs into the position shown in Figure 3 and prevents backward movement of the carriage. Upon completion of the welds to be effected, the latch 202 is manually operated and the carriage withdrawn and the finished work removed from the jig.

While the apparatus has been described in considerable detail, the operation thereof may be more clearly set forth in the following manner. Assuming the carriages 24 and 26 are in the position shown in Figure 4, the carriage 24 and jig associated therewith is loaded with a suitable stamping and the reinforcing members arranged in the proper position for feeding into the central portion of the welding machine, suitable clamps for this purpose, not shown, being used. At the same time, the finished work illustrated in the figure carried by the carriage 26 is removed and the operator on this side of the machine proceeds to similarly load. The carriage 24 is then moved along the track 22 to the central position within the machine, into abutment with the latch and stop 200 and beyond the latch and stop 202 so as to fix the carriage 24 in proper position in the machine. As soon as the carriage is so positioned, the valve 204 is actuated by the operator, the same being placed in a position readily accessible from either side of the machine. Actuation of the valve directs fluid pressure from the fluid pressure supply line 206 through the fluid pressure lines 208 to the expansible chamber devices 34 and 36 which elevate the lift 32 and the groups of welding electrodes 28 and 30. In raising the lift 32, the shouldered pins 78 engage the jig 76 and lift it from the carriage 24 into the welding position shown in Figure 5. As the lift reaches the welding position illustrated in Figure 5, the cam 210 carried by the lift actuates a cam operated switch 212 located upon a central support 214 of the track 22, which switch sets the distributor motor 122 in operation. Promptly, fluid pressure is sequentially delivered through lines diagrammatically indicated to the welding guns of the groups 42 and 44 and as each pair of guns or each single gun, where the guns are not in series, of each group engages the work through the application of fluid pressure thereto, the welding transformers 110 and 112 are energized and welds produced. After completion of the operation of all the welding guns 42 and 44, the distributor 120 finally actuates one of the fluid pressure valves 126 thereon connected to power actuators for the manually actuated valve 216 so as to automatically operate such valve and cause fluid pressure to be delivered from the supply pipe 218 through the supply lines 220 and 222 to immediately cause the actuation of the expansible chamber motors 186 and 188 as well as the expansible chamber motor 168, the former operating to raise the frame structure 46 from which the guns 42 are carried and the latter of which operates the frames 162 and from which the groups of welding electrodes 38 and 40 depend. At the same time the motor 122 is shut off.

As soon as the frame structure 46 reaches its upper position a cam 224 carried thereby (see Figures 5 and 6) actuates a cam operated switch 226 which in turn starts the valve operating motor 154 so that the distributor valves 150 and 152 are set in operation. Fluid pressure is thence distributed sequentially to pairs of electrodes connected to each of the transformers 130, 132, 134, 136. Thus a pair of electrodes fed by the transformer 130 as well as a pair of electrodes fed by the transformer 132 and pairs of electrodes fed by the transformers 134 and 136 are elevated into engagement with the work simultaneously with the lowering of corresponding electrodes above the work, into engagement with the work, and during such engagement each of the transformers is simultaneously energized and a pair of welds effected in series for each transformer.

As the distributor moves to the next adjacent valve another pair of electrodes is fed by each transformer and the corresponding upper electrodes are caused to move into engagement with the work and effect welds. Upon completion of all the welds, the distributor moves to a further distributor operated valve which is in turn adapted to direct fluid pressure to a fluid pressure operator 228 in conjunction with the valve 216 whereupon the valve 216 is reversed and fluid pressure is delivered to the opposite end of the expansible chamber motor 168 through the pipe line 230 to move the electrode groups 38 and 40 together, and at the same time, fluid pressure is distributed through the pipe line 222 to the upper side of the expansible chamber motors 186 and 188 whereupon the guns 42 and 44 are lowered to the starting position. At the same time, fluid pressure is delivered to a fluid pressure operator 234 of the manual valve 204 so as to actuate the manual valve thereby supplying the upper ends of the motors 34 and 36 with fluid pressure to lower the lift 32 thereby permitting the jig to again drop into engagement with the carriage 24 and lower the electrode groups 28 and 30 sufficiently therebelow so that the carriage upon release of the latch and stop 202 may be withdrawn from the central position to the unloading and loading position shown in Figure 1, 3 or 4 where the finished work may be removed from the jig and the jig reloaded with a new set of workpieces for welding.

As will be understood, the carriage 26 has been loaded by an operator during the intervening period while welds are being effected upon the workpieces carried on the jig fed into the machine by the carriage 24, and as soon as the carriage 24 is withdrawn from the central portion of the machine the carriage 26 is promptly inserted into position between the latches 200 and 202 and the welding machine again set into operation by actuation of the manual control valve 204.

Through a welding machine of the type described in which the welds are effected in sequence, the usual welding cycle for each set of simultaneously effected welds may be one second or less and consequently since 2 or 4 transformers or more may operate simultaneously, twenty or thirty sets of welds in sequence may be effected in a period of fifteen or twenty seconds, for example. This period is sufficient to permit an operator to load a jig and have the same in readiness for insertion into the machine as soon as the jig carrying the completed work is removed from the machine. It further enables the operator to use sufficient care in arranging the parts before feeding the same into the machine so that satisfactory welding results. At the same time, by providing two loading jigs the operation of the welding part of the machine is substantially continuous, since the time taken for removing one carriage and inserting the other carriage is but a matter of a second or two. Thus by the provision of a pair of carriages and jigs, the machine efficiency is substantially doubled and hundreds of welds effected in each cycle of operation. In addition, the stampings employed are often out of shape because of stacking and occasionally an operator will have trouble loading his jig in the usual time. In such case, the operator loading the other jig may complete the loading of his jig before the first operator can force the parts into proper shape and get his jig loaded. In such an instance, the second operator is able to proceed by moving his carriage into the machine and getting the welding machine into operation. Thus difficulties which may occur in loading the jig and delays incident thereto do not put the welding machine out of operation but merely reduce its productive capacity by being out of operation during the time taken to load a jig.

There is thus provided an apparatus for effecting a plurality of welds in a short space of time in workpieces wherein the close spacing of the welds and their angular relation with respect to one another would ordinarily present considerable difficulty. The apparatus is automatic in operation and places welding guns and electrodes into and out of position for effecting welds in a novel manner so that guns which would interfere with one another are freed from such possible interference. Also the apparatus is so organized as to be capable of continuous operation free from expensive shut down resulting from occasional defective workpieces and jigging difficulties.

Though the invention has been illustrated in a form suitable for accomplishing a particular piece of work, and but a single embodiment shown, it is to be understood that the invention is not limited thereto but may be embodied in various modifications and arrangements which may be made without departing from the spirit of the invention, as will be apparent to those skilled in the art. Accordingly, reference will be had to the appended claims for a definition of the limits of the invention.

I claim:

1. In a multiple welding apparatus, a plurality of sets of welding electrodes, means for supporting said sets for movement into and out of operative welding position, the operative position of one set being angularly disposed to the operative position of another set and being such as to interfere with the operative position of the other set, means for moving the one or the other of said sets into operative position and concomitantly moving the other to a non-operative non-interfering position, means for controllably effecting a series of welds by one of the sets of electrodes upon a workpiece and, upon completion of all the welds of the set of electrodes, moving the set to inoperative position while concomitantly moving the other set into operative position, and means for effecting a series of welds by said other set upon said workpiece when placed in operative position.

2. In a multiple welding apparatus, a frame having a base, spaced uprights and a transverse member connecting said uprights, a plurality of substantially vertical welding electrodes carried upon said transverse member and adapted for lateral movement therealong, a reciprocable frame vertically slidably mounted upon said uprights, and a plurality of welding electrodes carried thereby, and means for concomitantly moving said member carried electrodes into and out of operative position and said frame carried electrodes out of and into operative position.

3. In a multiple spot welding apparatus for effecting a plurality of welds in flanged workpieces in and about the flanges thereof, a frame, a plurality of substantially horizontal welding guns supported from said frame and adapted to effect welds in said flanges, means for elevating said workpieces to bring the flanges into operative welding relation with said welding guns, a plurality of welding electrodes carried by said frame above said workpieces and a plurality of welding electrodes carried by said elevating means below said workpieces, said electrodes above and below being brought into operative position except for alignment on opposite sides of said workpieces upon the elevating of said workpieces, means responsive to movement of said workpieces into operative welding position for sequentially operating said welding guns, means effective upon the completion of operation of all the welding guns for elevating said guns with respect to the workpiece flange, and frame, and for aligning the electrodes above with those below, and means for actuating said electrodes into engagement with the workpieces and effecting a plurality of welds.

4. In a multiple spot welding apparatus for effecting a plurality of welds in flanged workpieces in and about the flanges thereof, a frame, a plurality of substantially horizontal welding guns supported from said frame and adapted to effect welds in said flanges, means for elevating said workpieces to bring the flanges into operative welding relation with said welding guns, a plurality of welding electrodes carried by said frame above said workpieces and a plurality of welding electrodes carried by said elevating means below said workpieces, said electrodes above and below being brought into operative position except for alignment on opposite sides of said workpieces upon the elevating of said workpieces, means responsive to movement of said workpieces into operative welding position for sequentially operating said welding guns, means effective upon the completion of operation of all the welding guns for elevating said guns with respect to the workpiece flange, and frame, and for aligning the electrodes above with those below, means for actuating said electrodes into engagement with the workpieces and effecting a plurality of welds and means operative upon the completion of the welds effected by the welding electrodes, for lowering the workpiece, and returning the welding guns to their former position, and the electrodes above out of alignment with the electrodes below.

5. In a multiple spot welding apparatus a frame comprising vertical ways and horizontal ways, means elevatable on said vertical ways for carrying a group of welding electrodes, means transversely movable on said horizontal ways for carrying a second group of welding electrodes, said ways being such that said groups of electrodes are movable to interfering positions with respect to one another, a single source of motive power for said elevatable and transversely movable means, and power distributing mechanism for sequentially connecting said elevatable and transversely movable means with said source of motive power and for coordinating the movement of said groups of electrodes upon their respective ways to prevent interference between the groups.

6. In a multiple spot welding apparatus, a frame comprising a base member, spaced uprights thereon, and transverse spaced bridge members connecting said uprights, a track extending thru said frame between the uprights and above said base member, a carriage on said track, a work-supporting jig on said carriage, means for positioning said carriage in a predetermined relation with respect to said frame, means including a group of welding electrodes elevatable on said base member for engaging and raising said jig from said carriage and positioning said jig with workpieces thereon in welding position, a way on said transverse bridge members for supporting a group of welding electrodes adapted for movement into and out of alignment with the elevatable group of electrodes, a welding gun frame slidable on vertical ways on said spaced uprights and extending between said spaced bridge members, welding guns carried thereby and adapted to effect welds substantially at right angles to said electrodes, said guns and said alignable electrodes being adapted to interfere with one another when in their respective welding positions, and means for concomitantly moving the guns out of position with the movement of said electrodes into alignment and vice versa.

7. In a multiple spot welding apparatus, a frame comprising a base member, spaced uprights thereon, and transverse spaced bridge members connecting said uprights, a track extending thru said frame between the uprights and above said base member, a carriage on said track, a work-supporting jig on said carriage, means for positioning said carriage in a predetermined relation with respect to said frame, means including a group of welding electrodes elevatable on said base member for engaging and raising said jig from said carriage and positioning said jig with workpieces thereon in welding position, a way on said transverse bridge members for supporting a group of welding electrodes adapted for movement into and out of alignment with the elevatable group of electrodes, a welding gun frame slidable on vertical ways on said spaced uprights and extending between said spaced bridge members, welding guns carried thereby and adapted to effect welds substantially at right angles to said electrodes, said guns and said alignable electrodes being adapted to interfere with one another when in their respective welding positions, means for concomitantly moving the guns out of position with the movement of said electrodes into alignment and vice versa, and responsive to the raising of said jig to welding position to effect operation of said welding guns, and means acting on the completion of the welding operations of said guns for setting in operation said slidable frame to elevate said guns and concomitantly move said alignable electrodes into alignment, and means for effecting operation of said welding electrodes to effect welds upon alignment, and for reversing the movements of said alignable electrodes, said welding gun frame and elevatable means upon the completion of all welds effected by said electrodes.

8. In a welding apparatus, a frame, means for supporting a workpiece in position to be spot welded, a pair of mating electrodes for spot welding said workpiece at a predetermined location, a second pair of mating electrodes for spot welding said workpiece at a predetermined location adjacent to said first mentioned location, said locations being such that at least one of the electrodes of one pair is in a position in its operative position to interfere with the operative position of the electrodes of the other pair, means for moving said other pair of electrodes into operative position and concomitantly moving at least said one electrode to a non-operative non-interfering position, means for controllably effecting a spot weld by said other pair upon the workpiece to be welded, means for moving said other pair to inoperative position while concomitantly moving said one electrode into operative position with its mating electrode, and means for effecting a weld by said last named pair of electrodes upon said workpiece.

9. In a multiple welding apparatus, a support, means for holding a workpiece in operative position on said support, a first pair of mating electrodes mounted on said support, means for transposing said electrodes between inoperative position and said operative position along a predetermined path of movement, a second pair of mating electrodes mounted on said support, and means for transposing said second pair of electrodes between inoperative position and said operative position along a different predetermined path of movement, said operative position being such as to prevent simultaneous placement of both pairs of electrodes.

10. In a multiple welding apparatus, a support, means for holding a workpiece in operative position on said support, a first pair of mating electrodes mounted on said support, means for transposing said electrodes between inoperative position and said operative position along a predetermined path of movement, a second pair of mating electrodes mounted on said support, and means for transposing said second pair of electrodes between inoperative position and said operative position along a different predetermined path of movement, the transposition of said first and second pairs of electrodes being concomitant and opposite, and said operative position being such as to prevent simultaneous placement of both pairs of electrodes.

WILLIAM A. WEIGHTMAN.